Nov. 10, 1959 A. B. BLACKBURN 2,912,008
VALVE ACTUATING MEANS
Filed Aug. 27, 1954
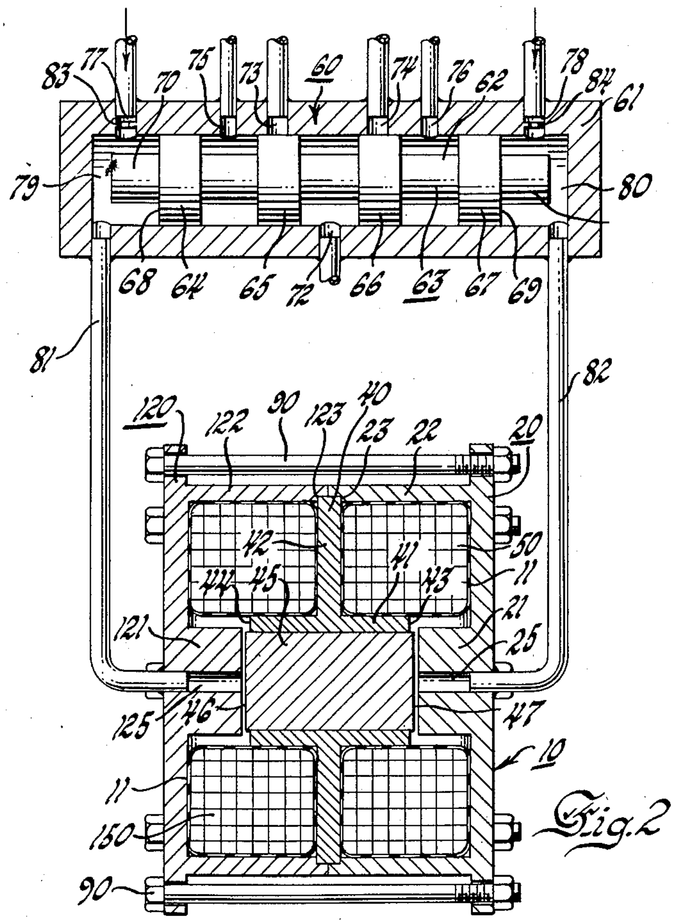
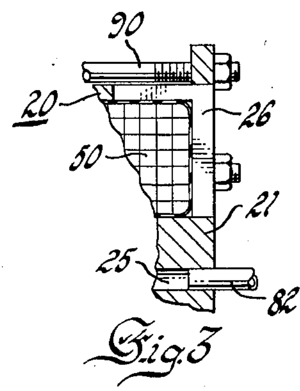
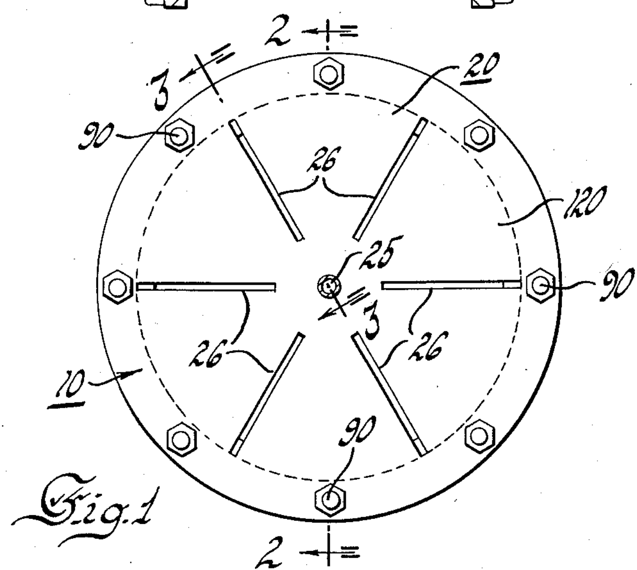
INVENTOR.
Alan B. Blackburn
BY
Craig V. Morton
HIS ATTORNEY United States Patent Office 2,912,008

Patented Nov. 10, 1959

2,912,008

VALVE ACTUATING MEANS

Alan B. Blackburn, Covington, Ohio, assignor to General Motors Corporation, Detroit, Mich., a corporation of Delaware Application August 27, 1954, Serial No. 452,671

7 Claims. (Cl. 137—623)

This invention pertains to valve actuating means, and particularly to a solenoid pivot valve construction for controlling actuation of a servo valve.

Heretofore, it has been common practice to employ solenoid actuated control valves in fluid pressure systems of various types. Moreover, solenoid valves have been designed for use in centrifugal fields, a valve of this type being disclosed in Patent No. 2,630,136, Brandes et al. In the past valves of the aforementioned type have exhibited tendencies to become inoperative by reason of the reciprocable plunger assembly being rendered immovable. This invention relates to valve actuating means wherein a solenoid operated valve of simplified construction is merely employed to control the actuation of a control valve in a fluid pressure system. Thus, the solenoid valve travel can be maintained at a minimum through the novel actuating system disclosed herein and the probability of the solenoid valve being rendered inoperative is extremely remote. Accordingly, among my objects are the provision of a solenoid operated valve of low power consumption which is capable of excitation at high frequencies; the further provision of a solenoid operated valve including a plunger having a short stroke thereby minimizing the variation in the air gap of the magnetic circuit; and the still further provision of a valve actuating system including an electrically operable pilot valve and servo actuated control valve.

The aforementioned and other objects are accomplished in the present invention by incorporating a plunger supported for reciprocable movement by a plain bearing, which is composed of magnetic material and constitutes part of the magnetic circuit. Specifically, the solenoid operated valve of this invention comprises a pair pole pieces which are designed to form a valve body when assembled. The pole pieces define a cavity within which a plain bearing member is supported. The plain bearing member, in turn, supports a plunger of magnetic material for reciprocable movement within the cavity. Each pole piece has associated therewith a magnetic winding, which magnetic windings are adapted to be alternately energized from any suitable pulsating source of power. In addition, each pole piece is formed with an inlet passage and a plurality of outlet passages.

The plunger is snugly received within the plain bearing and, accordingly, cannot be wedged therein due to the effects of external forces to which the valve may be subjected to in use. Moreover, the stroke of the plunger is extremely small so that movements of the plunger do not appreciably effect the air gap of the magnetic circuits. The end surfaces of the plunger constitute valve surfaces for blocking the inlet port of the pole piece which is excited by the magnetic winding.

The solenoid pilot valve is designed to control the operation of a servo actuated valve, which may comprise a valve cylinder having a bore within which a plunger is supported for reciprocable movement. The plunger is formed with a plurality of spaced lands, the end lands of which constitute piston surfaces for effecting movement of the valve plunger. Thus, servo chambers on each end of the plunger are connected with a source of low pressure fluid, these chambers also being connected to the inlet ports of the solenoid operated pilot valve. When neither winding of the solenoid operated pilot valve is energized, fluid will flow through both valve chambers and, thence, to the solenoid pilot valve. Inasmuch as the pressure potentials are equal on opposite sides of both the servo valve plunger and the solenoid valve plunger, both the plungers will be centered, and fluid will be circulated through the servo valve chambers to the pilot valve and then through the drain ports thereof.

However, when one of the magnetic windings of the solenoid operated pilot valve is energized, the plunger will be attracted to the energized pole pieces thereby closing the drain connection of one of the servo valve chambers. In this manner, the servo valve plunger will be actuated to move in a direction opposite to that of the solenoid plunger by reason of the pressure build up in the closed servo chamber. When the first winding is deenergized and the second winding is energized, the solenoid plunger will move into engagement with the other pole piece, thereby opening the first servo chamber to drain and blocking the second servo chamber which will result in movement of the servo actuated plunger in the opposite direction. It is to be understood that the solenoid windings are to be alternately energized for periods of equal or unequal time duration as controlled by pulse producing circuit of the type shown in copending application, Serial No. 94,984, filed May 24, 1949, in the name of Dinsmore, et al., now Patent No. 2,669,312. Thus, when the alternate periods of energization of the windings are of equal time duration, the servo valve will produce no net flow. However, when the alternate periods of solenoid winding energization are unequal, the servo actuated valve will produce a net flow in one direction, or the other.

Further objects and advantages of the present invention will be apparent from the following description, reference being had to the accompanying drawing wherein a preferred embodiment of the present invention is clearly shown.

In the drawing:

Fig. 1 is a side view, in elevation, of the solenoid pilot valve of this invention.

Fig. 2 is a composite view comprising a sectional view of the solenoid pilot valve taken on line 2—2 of Fig. 1, and a schematic view of a servo actuated control valve and servo system therefor.

Fig. 3 is a fragmentary sectional view taken along line 3—3 of Fig. 1.

With reference to the drawing, a solenoid operated valve 10 is shown, which valve comprises a pair of pole pieces 20 and 120 of magnetic material. The pole pieces 20 and 120 are of identical construction, and, accordingly, the construction of pole piece 20 will be described in detail, similar parts of pole piece 120 being denoted by similar numerals prefixed by 100. Pole piece 20 generally comprises a cup-shaped member having a centrally disposed projection 21 and a coaxially arranged annular portion 22. The annular portion 22 is formed with an internal shoulder 23, and the pole pieces 20 and 120 may be united by any suitable means so as to form a valve body, such as the bolts 90 as indicated in Fig. 2.

As shown in Fig. 2, the cup-shaped pole pieces 20 and 120, which constitute the valve body, define a cavity 11 within which a plain bearing member 40 is supported. The plain bearing member 40 includes a bearing surface 41 and a flange 42, which is received between the shoulders 23 and 123 of the pole pieces 20 and 120. The bearing surface 41 supports a plunger 45 of magnetic material, for reciprocable movement within the cavity 11. The projection 21 on the pole piece 20 has associated therewith a magneitc winding 50, the magnetic windings 50 and 150 having suitable terminals, not shown, which may be connected to a pulsating power source of the type disclosel in the aforementioned copending application, Serial No. 94,984, now Patent No. 2,669,312. In addition, the projection 21 on the pole piece 20 is formed with a central opening 25. End surface 46 of the plunger 45 constitutes a valve for closing the opening 125 in the pole piece 120, and then surface 47 of the plunger constitutes a valve for closing the opening 25 in the pole piece 20. As will be pointed out more particularly hereinafter, the seals effected by valve surfaces 46 and 47 need not be perfect. Moreover, inasmuch as the bearing assembly 40 is composed of magnetic material, it will be appreciated that the magnetic circuit of pole piece 20 includes the projection 21, the annular portion 22, the flange 42 of the bearing assembly 40 and portion 43 of the bearing. Moreover, the air gap between portion 43 and projection 21 does not vary with movements of the plunger 45. In a similar manner, a magnetic circuit of pole piece 120 includes projection 121, portion 122, shoulder 42 and portion 44 of the bearing assembly 40. It will further be appreciated that the stroke of plunger 45 is extremely small, and in actual practice may be in the order or .005 inch.

As is shown particularly in Figs. 1 and 3, the pole piece 120 is also formed with a plurality of radially extending slots 26, which communicate with the cavity 11 of the valve body. The slots 26 reduce the eddy currents within each pole piece thereby reducing the power required to alternately magnetize the two pole pieces. Another purpose of these slots, as well as the purpose of opening 25 in the projection 21 will be described hereinafter.

With reference to Fig. 2, the solenoid pilot valve 10 is shown in conjunction with a schematic servo system, which includes a servo actuated control valve 60 comprising a valve body or cylinder 61 having a bore 62 within which a plunger 63 is disposed for reciprocable movement in both directions under the urge of fluid pressure. The plunger 63 is formed with a plurality of spaced lands 64 through 67. Surface 68 of land 64 constitutes a piston for effecting movement of plunger 63 to the right, as viewed in the drawing, while surface 69 of land 67 constitutes a piston for effecting movement of the plunger 63 to the left. The plunger 63 is formed with suitable projections 70 and 71, which limit reciprocable movement of the plunger within the bore 62.

The valve body 61 is formed with a pressure supply port 72, which is connected to any suitable source of fluid pressure, not shown. The valve body 61 also includes a pair of control ports 73 and 74, which cooperate, respectively, with lands 65 and 66 of the plunger. In addition, the valve body 61 is formed with a pair of drain ports 75 and 76 and a pair of pressure ports 77 and 78, which communicate with servo chambers 79 and 80. The servo chambers 79 and 80, as shown, are connected by conduits 81 and 82 to inlet ports 125 and 25, respectively, of the solenoid operated pilot valve 10. Moreover, as shown in Fig. 2, the pressure ports 77 and 78 are formed with orifices 83 and 84, which reduce the pressure potential of fluid supplied to servo chambers 79 and 80. The fluid pressure system of which the valve 60 constitutes a component may be of the type disclosed in the aforementioned Patent 2,630,136.

*Operation*

The manner in which the solenoid operated pilot valve 10 controls the position of plunger 63 is substantially as follows. Initially, it is to be understood that the windings 50 and 150 of the solenoid operated pilot valve are connected to a source of pulsating power such that the windings 50 and 150 are alternately energized for periods of equal or unequal time duration. If neither winding 50 nor 150 is energized, fluid under pressure will flow through port 77 through chamber 79, conduit 81, port 125 and the drain ports of the pole piece 120. Similarly, fluid will flow through port 78, servo chamber 80, conduit 82, port 25, and the drain ports 26 of the pole piece 20. The opposed flows through ports 25 and 125, which act on surfaces 47 and 46 of the plunger 45 will center the plunger within the bearing 40 inasmuch as the total pressures acting on the opposed surfaces 46 and 47 are equal. In a similar manner, the pressure potentials in servo chambers 79 and 80 of the valve 60 are equal, thereby maintaining the plunger 63 in the mid-position shown in Fig. 2.

Upon energization of winding 50, the projection 21 will attract the plunger 45 and move valving surface 47 into engagement therewith. In so doing, conduit 82 is blocked from the drain ports 26, thereby causing a build-up of pressure in the servo chamber 80. Inasmuch as chamber 79 is connected to drain through port 125 of the pole piece 120, the unequal pressures acting on piston surfaces 68 and 69, with the pressure on surface 69 being the greater, will cause the plunger 63 to move to the left, as viewed in Fig. 2. When the plunger 63 moves to the left, which movement is limited by engagement of stop members 70 with the end wall of the valve body, port 72 will be connected with port 73, and port 74 will be connected to port 76, through the waist areas between lands 65 and 66, and 66 and 67, respectively. As soon as energization of winding 50 is interrupted, and by the nature of the power source for energizing the solenoid valve, winding 150 is concurrently energized, the plunger 45 will move to the left, as viewed in the drawing, thereby positioning valve surface 46 in engagement with pole piece projection 121. In this manner, servo chamber 80 will be connected to drain while servo chamber 79 will be blocked. Accordingly, pressure will build up in servo chamber 79, which will act on surface 68 so as to move the plunger 63 to the right so that stop member 71 engages the end wall of valve body 61. In this manner, port 72 will be connected with port 74 through the waist area between lands 65 and 66, while port 73 will be connected to port 75 through the waist area between lands 64 and 65. Inasmuch as only a pressure differential is necessary to effect movement of the servo valve plunger, the pilot valve element 45 need not form a perfect seal with ports 25 and 125. Thus, it is apparent that upon alternate energization of the windings 50 and 150 of the solenoid valve 10, the connections between ports 73 and 74 of the valve 60 will be reversed, and in this manner, a fluid motor, not shown, associated with the servo system, may be actuated.

As stated hereinbefore, the solenoid operated pilot valve 10 may be used to control rotatable apparatus such as variable pitch propellers, and in such instances, the valve 10 may be mounted within a centrifugal field. When the valve 10 is mounted in a centrifugal field, it is only necessary to maintain the plunger 45 at right angles to the action of centrifugal force. Inasmuch as the plunger 45 is a solid member, it will not deflect under the thrust of centrifugal force, and, consequently, will be free for reciprocable movement within the bearing assembly 40 under all conditions. Moreover, by reason of the extremely short stroke of the plunger 45, the power required to operate the valve 10 is considerably lower than that consumed by valves of the types shown in the aforementioned patent. This reduction in power consumption can be realized inasmuch as the pilot valve 10 does not directly control the flow of pressure fluid in a servo system, but is merely employed to actuate a servo valve.

While the embodiment of the present invention as herein disclosed, constitutes a preferred form, it is to be understood that other forms might be adopted.

What is claimed is as follows:

1. A solenoid valve assembly comprising, a pair of opposed pole pieces which constitute a valve body having an internal cavity, an internal bearing supported by said pole pieces within said cavity, each pole piece having a plurality of radial slots constituting outlet openings, said slots minimizing eddy currents within each pole piece, an electromagnetic winding associated with each pole piece, and a valve element of magnetic material disposed between said pole pieces and supported for reciprocable movement by said bearing, said valve element being capable of electromagnetic actuation into engagement with either of said pole pieces upon energization of their respective windings.

2. A solenoid valve assembly comprising, a pair of opposed pole pieces which are united to form a valve body having an internal cavity, each pole piece comprising a cup-shaped member having an inwardly extending projection formed on its bottom wall, said projections having openings therethrough constituting inlet ports, an electromagnetic winding associated with each pole piece projection, a hollow bearing element disposed within said cavity and supported by said pole pieces, and a plunger of magnetic material snugly received by said hollow bearing element and supported for reciprocable movement thereby upon alternate energization of said windings.

3. A valve comprising, a body having an internal cavity, a bearing assembly carried by said body and disposed within said cavity, said bearing assembly having a plain bearing surface, a valve element supported for reciprocable movement by said bearing surface, said body having a pair of inlet ports and a plurality of outlet ports, said inlet and outlet ports being interconnected when the valve element is in a mid-position, and means operable to effect reciprocable movement of said valve element to opposite sides of said mid-position so as to alternately close said inlet ports.

4. A pilot valve assembly comprising in combination, a pair of opposed pole pieces which constitute a valve body having an internal cavity, each pole piece comprising a cup-shaped member having a centrally located projection which extends into said cavity, said projections having openings therethrough constituting inlet ports for said valve body, said pole pieces having additional openings which constitute outlet ports for said valve body, a bearing element having a cylindrical bearing surface, means supporting said bearing element within said cavity so that the bearing surface is coaxially arranged within said cup-shaped members, a valve element supported by said bearing surface, and an electromagnetic winding associated with each pole piece projection whereby alternate energization of said windings will effect reciprocable movement of said valve element so as to alternately close said inlet ports.

5. A valve including, a valve body having a pair of inlet ports, said body having an outlet port associated with each inlet port and defining an internal cavity through which said inlet and outlet ports may be interconnected, a bearing element carried by said body and disposed in said cavity, a reciprocable valve element carried by said bearing, said inlet and outlet ports being interconnected when said valve element is in a mid-position, and means operable to effect reciprocable movement of said valve element to opposite sides of said mid-position for alternately closing said inlet ports.

6. A valve including, a pair of opposed pole pieces arranged to form a valve body having an internal cavity, said valve body having a pair of inlet ports and a pair of outlet ports which communicate with said cavity, a bearing supported by said pole pieces within said cavity, a valve element supported for reciprocable movement between said pole pieces by said bearing, and an electromagnetic winding associated with each pole piece whereby reciprocable movement of said valve element may be effected by alternate energization of said electromagnetic windings thereby causing said valve element to alternately close said inlet ports.

7. A valve including, a pair of opposed pole pieces arranged to form a valve body having an internal cavity, each pole piece comprising a cup-shaped member having inwardly extending projections formed on its bottom wall, an electromagnetic winding associated with each pole piece projection, a bearing element having a cylindrical bearing surface disposed within said cavity and supported by said pole pieces, and a valve element of magnetic material snugly received within said cylinder bearing surface and supported for reciprocable movement thereby upon alternate energization of said windings, said valve body having a pair of inlet ports and a pair of outlet ports which communicate with said cavity, said valve element being constructed and arranged to permit the closing of said inlet ports upon reciprocation thereof due to alternate energization of said windings.

References Cited in the file of this patent

UNITED STATES PATENTS

| | | |
|---|---|---|
| 2,366,412 | Lambert | Jan. 2, 1945 |
| 2,539,547 | Mossman et al. | Jan. 30, 1951 |
| 2,630,136 | Brandes | Mar. 3, 1953 |
| 2,644,426 | Moore | July 7, 1953 |
| 2,655,939 | Tauscher | Oct. 20, 1953 |
| 2,655,940 | Jackson | Oct. 20, 1953 |
| 2,725,077 | Nicholl | Nov. 29, 1955 |

FOREIGN PATENTS

| | | |
|---|---|---|
| 208,703 | Great Britain | 1929 |